United States Patent
Lu et al.

(10) Patent No.: US 7,988,302 B2
(45) Date of Patent: Aug. 2, 2011

(54) COOLING SYSTEM FOR PROJECTION DEVICE

(75) Inventors: Hou-Chen Lu, Taipei Hsien (TW); Kai Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 537 days.

(21) Appl. No.: 12/106,521

(22) Filed: Apr. 21, 2008

(65) Prior Publication Data

US 2009/0038787 A1    Feb. 12, 2009

(30) Foreign Application Priority Data

Aug. 9, 2007    (CN) .......................... 2007 1 0201313

(51) Int. Cl.
*G03B 21/26* (2006.01)
*G03B 21/16* (2006.01)

(52) U.S. Cl. ........................................... 353/57; 353/52

(58) Field of Classification Search .............. 353/52–61, 353/85; 362/546, 547, 236, 264, 294, 362; 362/373; 348/744, 748; 352/198, 202

See application file for complete search history.

(56) References Cited

U.S. PATENT DOCUMENTS

| | | | | |
|---|---|---|---|---|
| 3,138,715 A | * | 6/1964 | Walter | 307/11 |
| 5,136,397 A | * | 8/1992 | Miyashita | 348/748 |
| 5,860,042 A | * | 1/1999 | Tomaru et al. | 399/92 |
| 2008/0030689 A1 | * | 2/2008 | Hsu | 353/57 |

FOREIGN PATENT DOCUMENTS

| | | |
|---|---|---|
| JP | 2005338213 A | 12/2005 |
| TW | 200727118 A | 7/2007 |

* cited by examiner

*Primary Examiner* — Que T Le
*Assistant Examiner* — Jennifer Bennett
(74) *Attorney, Agent, or Firm* — Andrew C. Cheng

(57) ABSTRACT

A cooling system for cooling down a heat source of a projection device is disclosed. The cooling system includes a fan, and a control module. The control module is configured for supplying a first voltage to the fan for a first duration after the projection device is powered off and a second voltage to the fan for a second duration successive to the first duration. The second voltage is greater than the first voltage.

10 Claims, 2 Drawing Sheets

COOLING SYSTEM FOR PROJECTION DEVICE

FIELD OF THE INVENTION

The present invention relates to a cooling system, and more particularly to a cooling system for cooling down a heat source of a projection device.

BACKGROUND

At a meeting, a participant may connect an information processing system such as a computer to a projection device to project images provided by the information processing system. After use, the projection device and the information processing system are powered off and then may need to be packed away.

One difficulty with the use of the projection device to display information is that the projection lamps used produce substantial amounts of heat during operation. In order to ensure proper operation of electronic components within the projection device as well as the lamp, the projection devices are typically equipped with fans to dissipate the heat. It is desirable that the lamp be cooled off after operation prior to packing away the projection device. However, if the fan operates at a high speed it may cool off the lamp too quickly and damage it, and if the fan operates at a low speed then cool off time is inconveniently long.

Therefore, it is desirable to provide a cooling system that includes a variable speed fan, which can overcome the above mentioned problems.

SUMMARY

A cooling system for cooling down a heat source of a projection device is disclosed. The cooling system includes a fan and a control module. The control module is configured for supplying a first voltage to the fan for a first duration after the projection device is powered off and a second voltage to the fan for a second duration successive to the first duration. The second voltage is greater than the first voltage.

BRIEF DESCRIPTION OF THE DRAWINGS

The present invention may be understood, and its numerous objects, features, and advantages made apparent those skilled in the art by referencing the accompanying drawings. The use of the same reference number throughout the several figures designates a like or similar element.

DETAILED DESCRIPTION OF THE EMBODIMENTS

Embodiments of the present cooling system will now be described in detail below and with reference to the drawings.

Figure 1:
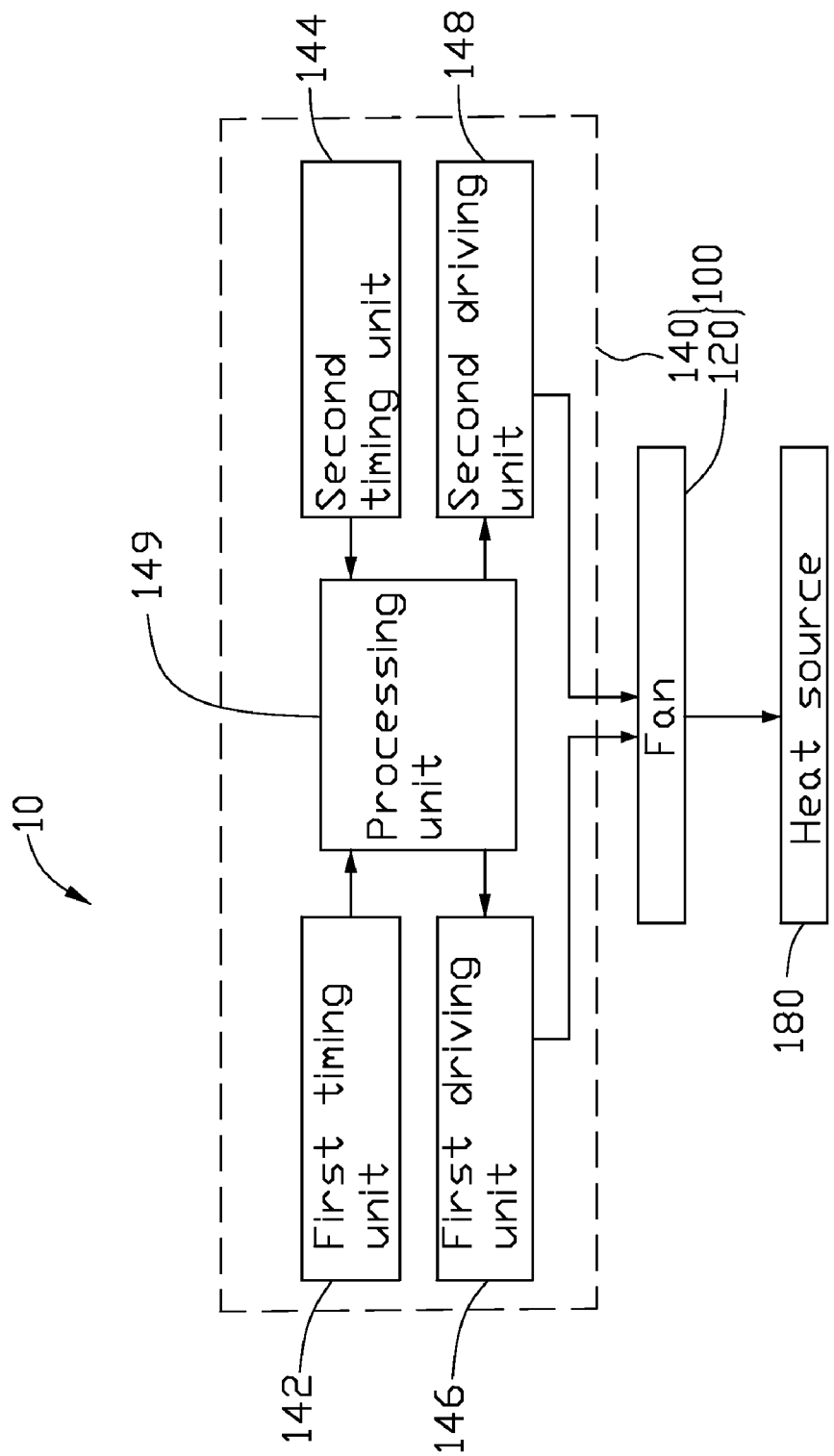
FIG. 1 is a schematic view of a cooling system according to a first embodiment.

FIG. 1 is a schematic view showing a cooling system 100 according to a first embodiment. The cooling system 100 and a heat source 180 are normally installed in a projection device 10. The cooling system 100 is configured for dissipating heat generated by the heat source 180 and cooling down the heat source 180 after the projection device 10 is powered off. The heat source 180 can be a lamp of the projection device 10. The cooling system 100 includes a fan 120 and a control module 140. The control module 140 includes a processing unit 149 electrically connected to a first timing unit 142, a second timing unit 144, a first driving unit 146, and a second driving unit 148. The fan 120 is electrically connected to the first driving unit 146, and the second driving unit 148.

The first and second timing units 142, 144 are configured for timing or counting a first duration and a second duration respectively. The first duration and the second duration can be set by the manufacturer, or the user. The first duration may be longer or shorter than, or equal to the second duration. In the embodiment, the first and second durations are set at 50 seconds, for a total of 100 seconds of cooling time.

The first and second driving units 146, 148 are configured for supplying a first voltage and a second voltage to the fan 120, respectively, thereby driving the fan 120 to work.

In this embodiment, the first and second voltages can be for example 6V to operate the fan 120 at a low speed, and 10V to operate the fan at a high speed, respectively. However, it should be understood that the present invention is not limited to the above given values, and the voltage values can be set as desired depending on the cooling requirements of the heat source 180.

The processing unit 149 is configured for controlling the first and second driving units 146, 148 and the first and second timing units 142, 144. In particular, the processing unit 149 triggers the first timing unit 142 and the first driving unit 146 immediately after the projection device 10 is powered off, and turns off the first driving unit 146 when the first timing unit 142 finishes counting, and then triggers the second timing unit 144 and the second driving unit 148, and finally turns off the second driving unit 148 when the second timing unit 144 times out. In the embodiment, the processing unit 149 provides the first voltage to the fan 120 during the first duration to lower temperature of the heat source 180 slowly until the temperature of the heat source 180 drops to an adequate level and then provides the second voltage to the fan 120 during the second duration to cool down the heat source 180 rapidly thus increasing lifetime of the heat source 180 while at the same time minimizing the time required to cool down the heat source 180.

Figure 2:
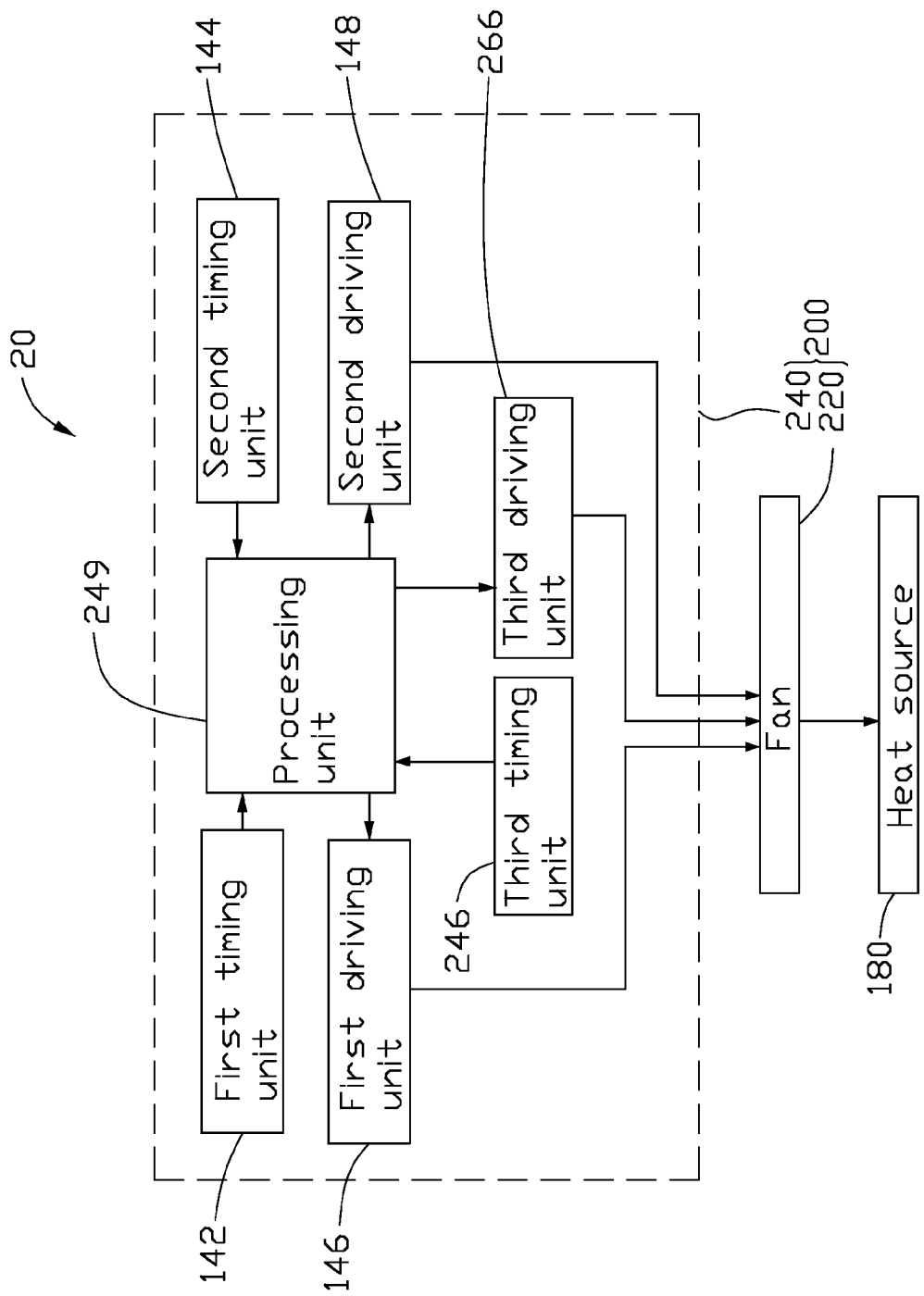
FIG. 2 is a schematic view of a cooling system according to a second embodiment.

FIG. 2 is a schematic view of a cooling system 200 installed in another projection device 20 according to a second embodiment. The cooling system 200 includes a fan 220 and a control module 240. The cooling system 200 is similar to the cooling system 100. The difference is that the control module 240 further provides a third timing unit 246 and a third driving unit 266. The third timing unit 246 is configured for counting a third duration. The third driving unit 266 is configured for supplying a third voltage to the fan 220, thus driving the fan 220 to work. However, the third voltage is greater than the second voltage, which is higher than the first voltage, thus providing three cooling stages for the heat source 180.

The processing unit 249 triggers the third timing unit 246 and the third driving unit 266 immediately after the second duration is over, and finally, turns off the third driving unit 266 when the third timing unit 246 times out. The third duration may be different than or equal to the second duration or first duration. In the embodiment, the first, second, and third durations are set at 40, 30, 10 seconds for a total of 80 seconds of cooling time, providing a shorter cooling time than provided in the first embodiment. Other aspects of the second embodiment are the same as that of the first embodiment, and so are not described in detail.

Understandably, the cooling system can include any desired number of driving units and timing units and is not limited to two or three. The cooling system cools down the heat source 180 in stages by supplying incrementally increased voltages generated by the driving units for the corresponding duration as timed by the corresponding timing unit.

It will be understood that the above particular embodiments are described and shown in the drawings by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A cooling system for cooling down a heat source of a projection device, comprising:
    a fan; and
    a control module configured for supplying a first voltage to the fan for a first duration after the projection device is powered off, and a second voltage to the fan for a second duration successive to the first duration, the first duration being a preset length of time, the second duration is a preset length of time, the second voltage being greater than the first voltage, and the control module comprising:
        a first driving unit configured to supply the first voltage;
        a second driving unit configured to supply the second voltage;
        a processing unit;
        a first timing unit connected to the processing unit, and configured for timing the first duration; and
        a second timing unit connected to the processing unit, and configured for timing the second duration;
        wherein the processing unit is configured to trigger the first driving unit during the first duration, and trigger the second driving unit and turn off the first driving unit after the first timing unit finishes timing the first duration.

2. The cooling system as claimed in claim 1, wherein the first duration is the same as the second duration.

3. The cooling system as claimed in claim 1, wherein the first duration is shorter than the second duration.

4. The cooling system as claimed in claim 1, wherein the first duration is longer than the second duration.

5. The cooling system as claimed in claim 1, wherein the control module further comprises:
    a third driving unit having a third voltage, greater than the second voltage; and
    a third timing unit connected to the processing unit, and configured for timing a third duration successive to the second duration, the third duration being a preset length of time;
    wherein the processing unit is further configured to trigger the third driving unit during the third duration and turn off the second driving unit after the second timing unit times out.

6. The cooling system as claimed in claim 1, wherein the heat source is a lamp of the projection device.

7. The cooling system as claimed in claim 1, wherein the preset length of time of the first duration and the preset length of time of the second duration are both 50 seconds.

8. A cooling system for cooling down a heat source of a projection device, comprising:
    a fan; and
    a control module configured for supplying a plurality of incrementally increased voltages to the fan in stages after the projection device is powered off, the control module comprising:
        a plurality of driving units configured to supply the incrementally increased voltages respectively;
        a processing unit; and
        a plurality of timing units connected to the processing unit, and configured for timing a plurality of durations respectively, each of the durations being a preset length of time;
        wherein the processing unit is configured to trigger each of the driving units successively with each driving unit triggered during a respective one of the plurality of durations as timed by the timing units.

9. The cooling system as claimed in claim 8, wherein the heat source is a lamp of the projection device.

10. The cooling system as claimed in claim 8, wherein the preset length of time of each of the durations is 50 seconds.

* * * * *